No. 769,321. PATENTED SEPT. 6, 1904.
J. W. PACKARD.
CLUTCH.
APPLICATION FILED JULY 7, 1903.
NO MODEL.

Witnesses
Inventor
James W. Packard.
by Foster Freeman & Watson
Attorneys

No. 769,321. Patented September 6, 1904.

UNITED STATES PATENT OFFICE.

JAMES W. PACKARD, OF WARREN, OHIO, ASSIGNOR TO PACKARD MOTOR CAR COMPANY, OF WARREN, OHIO, A CORPORATION OF WEST VIRGINIA.

CLUTCH.

SPECIFICATION forming part of Letters Patent No. 769,321, dated September 6, 1904.

Application filed July 7, 1903. Serial No. 164,595. (No model.)

*To all whom it may concern:*

Be it known that I, JAMES W. PACKARD, a citizen of the United States, residing at Warren, in the county of Trumbull and State of Ohio, have invented certain new and useful Improvements in Clutches, of which the following is a specification.

The clutch forming the subject-matter of the present invention is especially designed for use in automobiles; but it is adapted for other purposes, and it is desired to protect it for all purposes to which it may be applicable.

Figure 1:
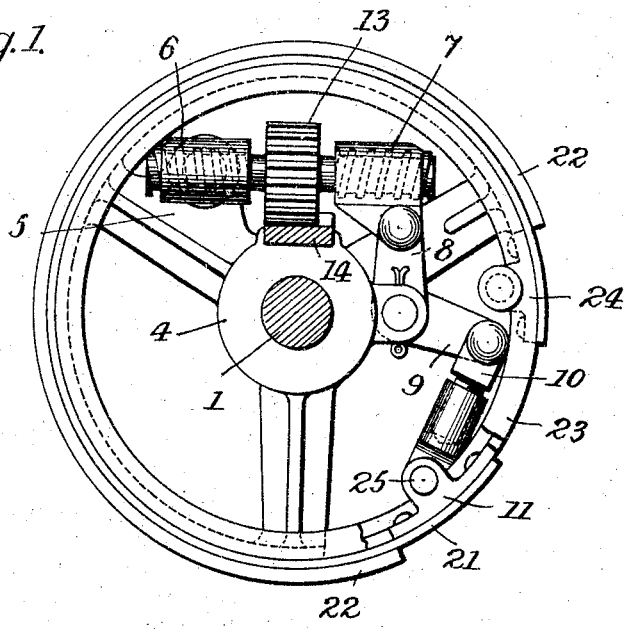
Figure 2:
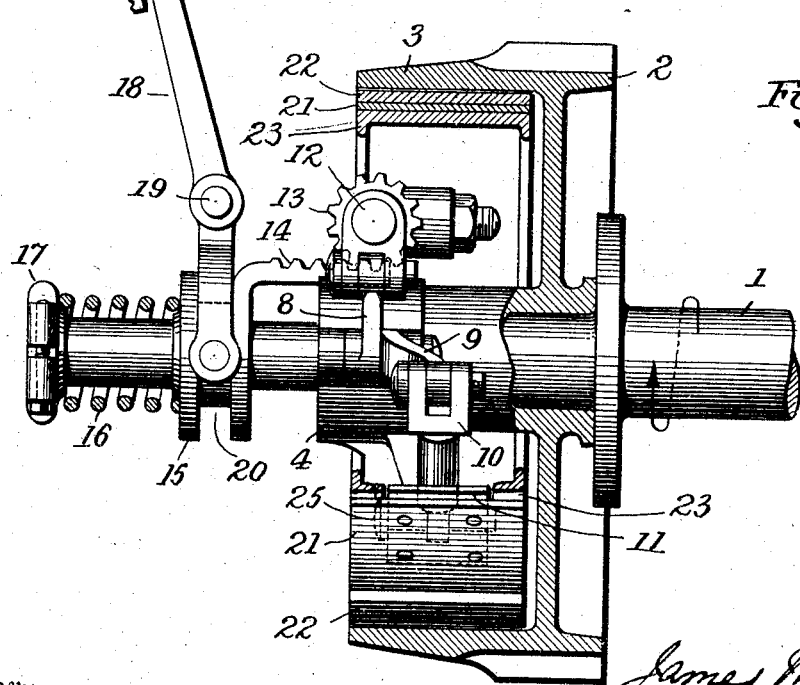

In the accompanying drawings, Figure 1 is a face view of the inner member of the clutch; and Fig. 2 is a side view of the clutch, partly in section.

Referring to the drawings, 1 indicates a constantly-rotating shaft, and 2 a gear or pulley loose on said shaft and adapted to be connected to it by the clutch. The gear or pulley 2 has an extended flange 3, which forms one of the clutch members, said flange having a cylindrical inner surface. Fast upon the shaft within the clutch member 3 is a hub 4, upon which the movable clutch member is mounted. To a spoke 5 of the hub 4 is pivotally connected an internally-threaded block 6. A similar but oppositely-threaded block 7 is connected to one arm, 8, of an elbow-lever. The other arm, 9, of said lever is connected by an adjustable link 10 with bracket 11 on one end of a circular clutch member which lies within the clutch member 3. A short shaft 12 is provided with right and left threads fitting the blocks 6 and 7 and with a central pinion 13, which is in engagement with a rack 14, connected to a collar 15, which slides on and turns with the shaft 1.

The clutch may stand normally open or closed. As illustrated, it is normally closed by a spring 16, arranged between the collar 15 and the fixed head or collar 17 on the shaft. A foot-lever 18, pivoted to a fixed part at 19 and having a yoke engaging an annular groove 20 in the collar 15, may be used to open the clutch and release the gear or pulley 2.

The inner clutch member comprises a steel band 21, with a facing of leather or other suitable material 22. The band 11 when contracted rests upon a rim 23, supported by spokes from the hub 4. One end of the band 11 is connected to the rim 23 at 24, while the other end is connected to the link 10 at 25.

In operation the clutch is preferably arranged so that in expanding the inner member the joint 25 travels in a direction contrary to that in which the shaft is traveling. The engagement of the inner member with the outer member therefore tends to increase the grip of the clutch. It is found in practice, however, that the clutch may be readily released with little effort by means of the foot-lever 18 or otherwise. As the pinion 13 travels laterally in opening and closing the clutch, the rack 14 is preferably made wide enough to engage it at all points.

Having described my invention, what I claim as new, and desire to secure by Letters Patent, is—

In a clutch, the combination with a shaft, of the outer clutch member, the inner clutch member consisting of an expansible metal band located within the outer clutch member and having one end rigidly connected with a hub mounted on the shaft, a longitudinally-movable rack on the hub, a lever fulcrumed on the hub and having one arm connected to the movable end of the expansible band and its other arm engaging an adjusting-screw, and a pinion meshing with the rack and adapted to turn said screw to expand or contract the expansible band, all of said parts being arranged within the space bounded by said band.

In testimony whereof I have signed my name to this specification in the presence of two subscribing witnesses.

JAMES W. PACKARD.

Witnesses:
 RUSSELL HUFF,
 H. V. BATCHELLER.